United States Patent [19]
Clearman et al.

[11] 3,708,992
[45] Jan. 9, 1973

[54] METHOD OF MAKING ICE IN A COMBINED AUGER AND PRESS

[75] Inventors: Jack F. Clearman, Stevensville, Mich.; Leonard W. Ohlsson, Saint Paul, Minn.; Michael H. Mackin, Kankakee, Ill.

[73] Assignee: Whirlpool Corporation, Benton Harbor, Mich.

[22] Filed: March 3, 1972

[21] Appl. No.: 231,498

Related U.S. Application Data

[62] Division of Ser. No. 867,222, Oct. 17, 1969.

[52] U.S. Cl. ................................................62/71
[51] Int. Cl. ............................................F25c 1/14
[58] Field of Search ..........62/71, 320, 354; 425/378; 100/145, 117

[56] References Cited

UNITED STATES PATENTS 2,071,465  2/1937  Huber..................................62/354 X
3,196,624  7/1965  Reynolds............................62/354 X

FOREIGN PATENTS OR APPLICATIONS 409,499  5/1934  Great Britain...........................62/354

Primary Examiner—William E. Wayner
Attorney—James S. Nettleton et al.

[57] ABSTRACT

A method of making ice with a combined auger and press wherein a continuous augering step harvests thin films of ice product whereupon the ice product is collected and mechanically transferred from a second stage collection zone to a third stage compression zone. The collected ice product is then compression-augered to remove excess water and to extrude the product in the form of a compacted dehydrated hard ice column, whereupon an obstruction is interposed in the path of movement of the emerging hard ice column to shatter the column into separate pieces of selected utilitarian size and configuration.

2 Claims, 7 Drawing Figures

PATENTED JAN 9 1973 3,708,992

METHOD OF MAKING ICE IN A COMBINED AUGER AND PRESS

This is a division of application Ser. No. 867,222 filed Oct. 17, 1969.

BACKGROUND OF THE INVENTION

1. Field of the Invention

This invention relates generally to ice maker constructions, and more particularly refers to interchangeable extrusion means for producing variously configured ice products.

2. Description of the Prior Art

Ice makers have been provided heretofore which produce an ice flake product by scraping ice from the side walls of the cylindrical freezing cylinder. Such ice makers are frequently provided with an integrally formed compression chamber for removing excess water from the ice flake product and forming an ice product having only one configuration.

SUMMARY OF THE INVENTION

The present invention provides a method of making ice wherein an ice product is produced by scraping inner walls of a cylindrical freezing compartment with peripheral edges of helical flights formed on a substantially vertically disposed harvesting auger. A wet mass of ice particles, including slush and chunks, is axially advanced out of the freezing chamber and into a collecting chamber forming an outlet for the freezing chamber.

A screw shaft extends through a discharge opening of the collecting chamber and is corotatable with the harvesting auger. The screw shaft advances the flake ice product harvested by the auger in a columnar form through a discharge chamber and forces the mass of ice particles through a compression means such as an extrusion member or die, thereby to form an ice product of a desired configuration depending upon the form of the extrusion member.

The present invention provides several interchangeable extrusion members or dies arranged and formed to produce variously configured ice products such as "ice cubes", cracked ice of either irregular or substantially uniform size, or ice flakes. In one form of the present invention, the extrusion member has a gradually tapered compression section for removing excess water from the ice flake product and a throat or outlet section formed as a continuation of the exit shape of the compression section for holding the compressed ice product together to prevent stress cracks from forming. With that configuration, the extrusion member forms an emerging column of hard and crack-free ice.

Several different means may be provided outwardly of the extrusion member for working the column of hard ice to form "ice cubes" of uniform length or substantially uniform flakes of cracked ice.

In another form of the invention an extrusion member has a gradually tapered compression section and a cracking section having sharply tapered inner walls formed at an exit of the compression section. As the hard ice in the compression section hits the sharply tapered inner walls of the cracking section, the compressed mass of ice splits or cracks along planes substantially perpendicular to the flow of the ice to form thin layers of cracked ice.

Still another form of the present invention provides an extrusion member having a cracking section characterized by sharply tapered inner walls defining a reduced diameter outlet opening and disposed adjacent an outlet of the discharge column. That form of the extrusion member produces irregularly shaped chips or flakes of ice.

The ice maker of the present invention is further characterized by releasable attachment means removably clamping one of the extrusion members to the discharge chamber at an outlet end thereof, thereby enabling one of the extrusion members to be removed and replaced by an extrusion member of a different configuration to adapt the ice maker for selectively producing differently configured ice products.

BRIEF DESCRIPTION OF THE DRAWINGS

In the accompanying drawings forming a part of this specification and in which like reference characters are employed to designate like parts throughout the same:

FIG. 6 is a view similar to FIG. 2 and illustrating an extrusion means constructed in accordance with a fifth embodiment of the present invention; and FIG. 7 is a view similar to FIG. 2 and illustrating an extrusion means constructed in accordance with a sixth embodiment of the present invention.

DESCRIPTION OF THE PREFERRED EMBODIMENTS

Figure 1:
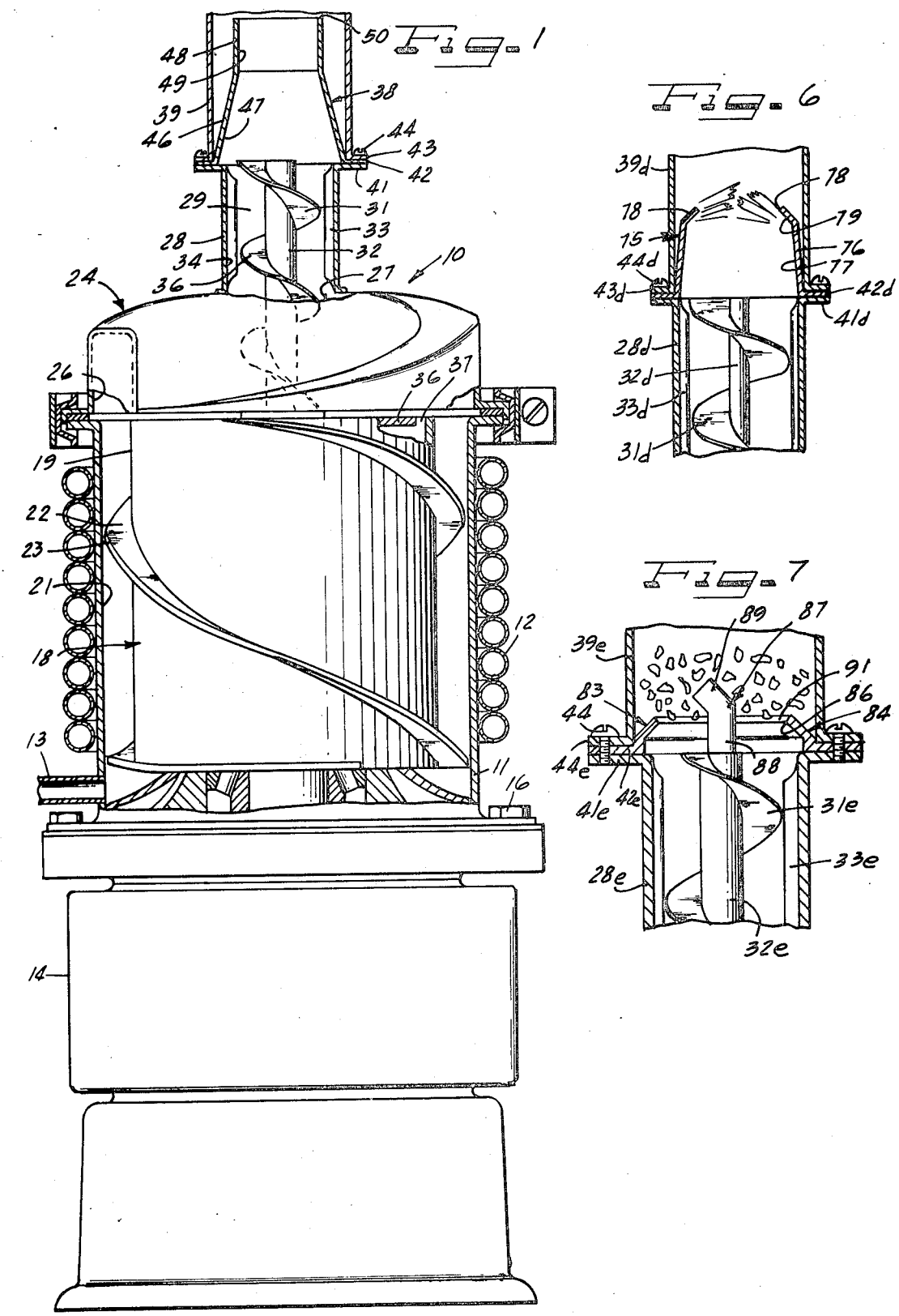
FIG. 1 is a cross sectional view of an ice maker construction utilizing an improved extrusion means and attachment means therefor of one embodiment of the present invention.

Referring to the drawings, an improved ice maker 10, embodying the features of the present invention, desirably includes a generally upright cylindrical freezing cylinder 11 having disposed in circumjacent relation thereto coils 12 of an evaporator forming part of a refrigeration system.

Water is introduced into the cylinder 11 through an inlet conduit 13 disposed near the base of the cylinder. The cylinder 11 is mounted in a generally upright position on a drive housing 14 by suitable fastening means, such as bolts 16. Within the drive housing 14 and cylinder 11, there is a centrally disposed shaft 17 having a lower end portion thereof supported within bearing means and driven through a gear reduction means by a suitable motor.

An auger 18 is connected to the shaft 17 and projects upwardly into the freezing cylinder 11. The auger 18 has a cylindrical portion 19 spaced inwardly of a cylindrical, refrigerated wall 21 of the cylinder 11. The cylindrical portion 19 has an outer diameter relatively larger than the diameter of the shaft 17 and carries helically disposed blades as at 22 having scraping edges 23 which scrape the inner wall 21, thereby to harvest a thin film of ice which forms on the refrigerated surface whenever water is circulated in the freezing cylinder 11. Also, rotation of the harvesting auger 18 progressively advances a mixture of ice particles, including slush and chunks, upwardly toward an upper end portion of the cylinder 11 and into a collecting chamber 24.

The collecting chamber 24 may comprise a generally circular or cup-shaped cap member provided with channels as at 26 which define generally spiral paths of increasing cross-section for the flake ice product discharged from the freezing chamber by the flights 22, and therefore, the flake ice product is given a generally spiral, upwardly ascending motion through channels of constantly increasing cross sectional area. The collecting chamber 24 conducts the mass of ice particles through a discharge opening 27 and into a conduit 28 forming a discharge passage 29 extending upwardly of the top of the collecting chamber.

One or more helically disposed blades 31 having a diameter considerably less than the diameter of the harvesting auger 18 containing the flights 22 are secured onto a shaft 32 corotatably supported by the harvesting auger 18 and extending upwardly from the auger through the collecting chamber 24 and into the discharge passage 29. The screw shaft 32 in the illustrated embodiment has an uppermost end disposed substantially co-extensive with an uppermost end of the discharge conduit.

The discharge conduit 29 is characterized by a plurality of axially extending ribs 33 formed in a circumferentially spaced arrangement around an inner wall 34. The helically disposed blades 31 carried by the screw shaft 32 are sized to extend through the outlet or discharge opening 27 formed in the collecting chamber 24 and have peripheral edges as at 36 rotating closely adjacent inner edges of the ribs 33. Thus, the helically formed screw blades 31 axially drive a mass of flake ice product in the form of a confined columnar path defined by the discharge passage 29.

Immediately subjacent the collecting chamber 24 and connected in corotatable assembly with the shaft 32 is a disc baffle 36. An annular space 37 is provided between an outer edge of the disc baffle 36 and the cylindrical wall 19 of the harvesting auger 18, thereby permitting excess water removed from the advancing mass of ice particles to drain downwardly for recirculation through the freezing compartment.

In accordance with the principles of the present invention, an extrusion means 38 is detachably secured at an exit end of the discharge conduit 28 and enclosed within a conduit 39 arranged to deliver an ice product formed by the extrusion means to a point of utilization. The extrusion means 38 includes a member composed of a hard material such as steel or a hard plastic. The illustrated extrusion member 38 has a symmetrical configuration in transverse cross section and is arranged coaxially of the screw shaft 32 carrying the helical flights 31, and thus the ice mass advanced by the screw shaft is forced through and worked by the extrusion member.

The discharge conduit 28 is further characterized by a generally outwardly projecting support flange 41, and the extrusion means 38 has a base flange 42 resting on the supporting flange and formed substantially co-extensive therewith. Also, the delivery conduit 39 has an attachment flange 43 formed to overlie the base flange 42 of the extrusion means 38. Releasable attachment means, such as screws 44, pass through aligned apertures formed in the support flange 41, the base flange 42 and the attachment flange 43, thereby to clamp the delivery conduit 39 and the extrusion means 38 unto the support flange of the discharge conduit 28. Thus, the extrusion means 38 may be easily removed by withdrawing the fastening means 44, and therefore, the present invention provides means enabling one form of the extrusion means to be removed and replaced by an extrusion means of another form or configuration.

In accordance with a first embodiment of the present invention, the extrusion means 38 is formed to produce an emerging column of hard ice which is substantially free of stress cracks. As illustrated in FIG. 1 the extrusion means 38 has a compression section 46 characterized by gradually upwardly and inwardly tapering inner walls 47 and an outlet or throat section 48 having substantially parallel inner walls 49 formed as a continuation of an exit shape of the compression section 46. As the helical flights 31 carried on the shaft 32 force the wet ice particles through the extrusion means 38, the cross sectional areas of the column of advancing ice are gradually reduced, thereby to squeeze excess water from the ice product and form a compacted column or mass of advancing ice. The parallel throat or outlet section 48 holds the compacted column or shaft of ice together to prevent stress cracks from forming in the column, thereby producing a crack-free column of hard ice emerging from the extrusion means 38.

The extrusion means 38 may have any suitable cross-sectional configuration such as a round shape or a rectangular shape, depending upon the desired configuration of the emerging ice column. The emerging ice column is directed to a point of utilization by the delivery conduit 39, and the column may be passed through an ice crusher to form chips of crushed ice or the column may be broken into discrete lengths to form "ice cubes".

Figure 2:
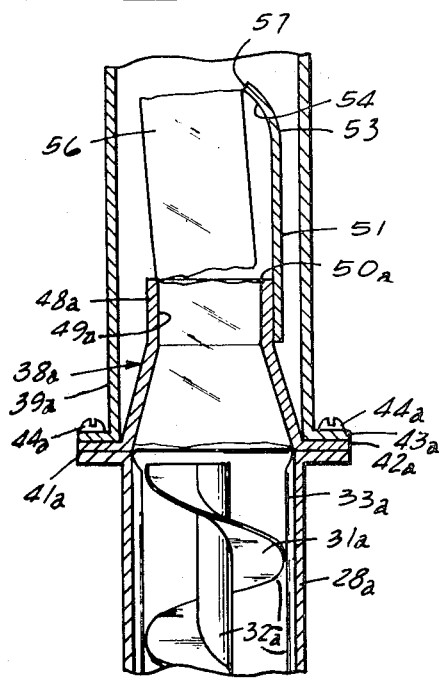
FIG. 2 is an enlarged, fragmentary sectional view of an uppermost portion of the ice maker shown in FIG. 1 and illustrating an extrusion means constructed in accordance with a second embodiment of the present invention.
Figure 3:
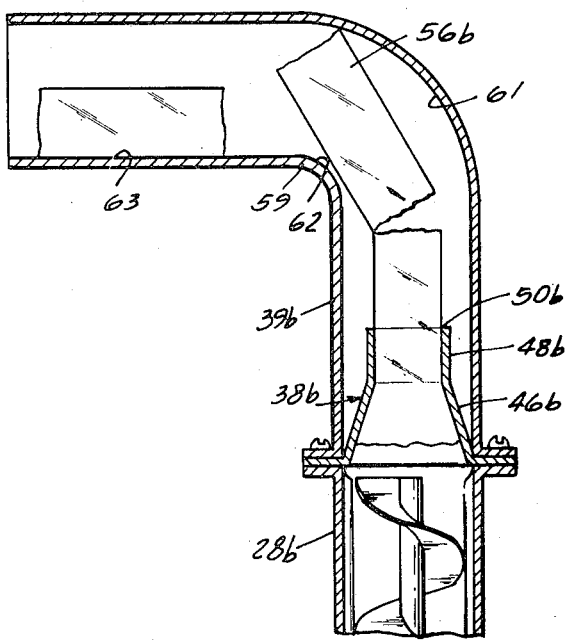
FIG. 3 is a view similar to FIG. 2 and illustrating an extrusion means constructed in accordance with a third embodiment of the present invention.

As illustrated in FIGS. 2 and 3, one means for shearing the emerging column of hard ice into discrete lengths for producing "ice cubes" may include an action surface intercepting the path of movement of the ice column for laterally directing the column, thereby to cause the column to shear near an exit mouth 50 of the extrusion means. In describing this alternate embodiment and other alternate embodiments, like elements will be designated by like reference characters to which a small a, b, etc. has been added, depending upon the particular embodiment.

A second embodiment of the present invention, as illustrated in FIG. 2, contemplates forming the action surface intercepting the path of movement of the emerging column of ice on a breaking member 51 secured to an outside wall of the parallel section 48a of the extrusion means 38a and projecting upwardly from the exit mouth 50a of the extrusion means. The breaking member 51 has a width sized to extend around a relatively small segment of a periphery of the extrusion member 38a. Also, the breaking member 51 is characterized by a bent portion 53 gradually curving toward a longitudinal axis of the extrusion member 38a and forming an arcuate action surface 54 intercepting the path of upward movement of the emerging ice column as indicated at 56, so that an uppermost edge of the emerging column of hard ice engages against the action surface and is laterally directed or urged to create a shearing force substantially along a line parallel with the exit mouth 50a. In this manner the emerging column of hard ice 56 is broken into short lengths to form "ice cubes" which are pushed past a terminal edge as at 57 of the breaking member 51 by the continuously advancing column of ice and directed along the delivery conduit 39a to a point of utilization.

If desired, the action surface for laterally urging the advancing column of hard ice to produce "ice cubes" may be formed on the delivery conduit 39b, as illustrated in FIG. 3. In that form of the present invention, the delivery conduit 39b is characterized by a substantially right angle bend as at 59 forming an arcuate inner wall 61 overlying and spaced from the exit mouth 50b of the extrusion member 38b. As the continuously advancing column of hard ice engages against the arcuate surface 61, the uppermost edge of the ice column tends to follow the contour of the action surface, thereby creating a transverse shear force through the column along a plane approximately parallel with the exit mouth 50b of the extrusion member 38b when the column first engages the action surface.

When the initial crack has been widened sufficiently to completely sever an "ice cube" as at 56b from the solid column, the thus formed "ice cube" falls against an inner surface as at 62 of the bend 59 and pivots unto the substantially horizontal surface 63 of the delivery conduit 39b to be pushed by subsequently formed and advanced "ice cubes" to a point of utilization.

Figure 4:
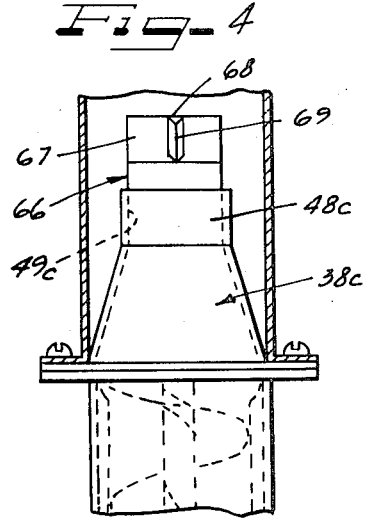
FIG. 4 is a view similar to FIG. 2 and illustrating an extrusion means constructed in accordance with a fourth embodiment of the present invention.
Figure 5:
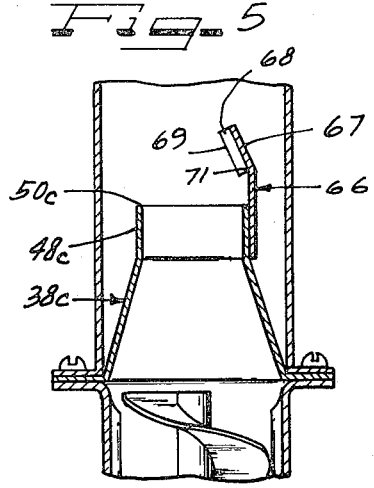
FIG. 5 is a sectional view taken along line V—V of FIG. 4.

Some users may desire to adapt the ice maker 10 to produce relatively thin layers of ice or smaller "ice cubes" of substantially uniform size. As illustrated in FIGS. 4 and 5, smaller "ice cubes" may be produced by providing an extrusion means shearing the column into thin layers and splitting the layers into smaller chunks. This means may include a breaking arm 66 secured to an outer surface of the parallel section 48c of the extrusion member 38c and characterized by an obliquely formed portion 67 carrying a wedge member 68 forming a knife edge 69 for crosswise splitting of the layers formed by the oblique section. In this embodiment of the present invention, the extrusion member 38c desirably has a square or rectangular cross section and the breaking arm 66 has a width sized to be substantially co-extensive with spacing between opposed parallel walls 49c of the parallel section 48c of the extrusion member 38c. Thus, the oblique portion 67 of the breaking arm 66 engages across an entire width of the emerging column of hard ice.

The oblique portion 67 has a distinct bend as at 71 rather than the smooth arcuate configuration as described hereinabove for the forms of the present invention utilized for producing "ice cubes" and the bend 71 is located relative to the exit mouth 50c to form layers of ice having a desired thickness. The thickness of the layers sheared from the ice column varies in proportion to the distance between the bend 71 and the mouth 50c of the extrusion member 38c, and the breaking arm 66 may be secured to the extrusion member in a manner to be adjustable in directions axially of the extrusion member, thereby to permit adjustment of the thickness of the layers.

The wedge 68 is welded or otherwise secured to the oblique portion 67 and positioned intermediate end edges of the oblique portion, and thus, the knife edge 69 formed by the wedge member 68 splits the sheared layers substantially into two equal, rectangular ice chunks which are particularly desirable for use with chilled beverages.

Irregular flakes or chips of hard ice may be desirable for some applications, and it is contemplated by the present invention to provide extrusion means which, due to their configuration, inherently produce irregular chips or flakes of hard ice and which are interchangeable with the extrusion member 38 configured to form a column of hard ice. Thus, the basic ice maker may be conveniently adapted for producing irregular flakes or chips of hard ice by withdrawing the fastening means 44 and replacing the extrusion member 38 with an extrusion member configured to form flakes or chips.

As illustrated in FIG. 6, an extrusion member 75 for forming irregular flakes of hard ice may comprise a substantially tubular member having a symmetrical cross section and characterized by a base flange 42d resting upon the supporting flange 41d formed at the uppermost end portion of the discharge conduit 28d and clamped into an assembled arrangement by the fastening means 44d. The extrusion member 75 of this embodiment of the present invention has a compression section 76 presenting gradually upwardly and inwardly tapered inner walls 77 and a short cracking section 78 characterized by sharply tapered or converging inner walls 79 defining a reduced diameter exit or outlet opening 81. The mass of ice particles advanced from the harvesting auger and the collecting chamber by the helical blades or flights 31d is compressed in the compression section 76, thereby removing excess water from the mass of ice particles, including slush and chunks, and forming a relatively hard ice product. The hard ice formed in the compression section engages the sharply tapered inner walls 79 of the cracking section 78 causing stress cracks to form perpendicular to the flow of the ice mass. The transverse stress cracks cause thin layers or chunks of ice to split from the advancing column and pivot around the exit mouth or outlet opening 81 for delivery through the conduit 39d to a point of utilization.

Chips or flakes of ice of varying sizes may be produced by varying the sharpness of the taper of the inner walls 79 of the chip forming section 78 or by changing either the cross sectional configuration or the number of tapered sides of the extrusion member 75. For example, with the extrusion member 75 formed with a square cross section and one pair of opposed sides tapered inwardly to form a pair of converging inner walls as at 79, the extrusion member will produce layers or flakes splitting into two pieces approximately along a crosswise plane intermediate confronting edges of the tapered sections forming the exit 81. Also, the layers may be broken into substantially four equal pieces or flakes by forming the extrusion member with a square cross sectional configuration and tapering both sets of opposed sides inwardly to form four chip forming surfaces. The thickness of the sheared layers may be increased by decreasing the sharpness of the taper of the inner walls 79 of the chip forming section 79, and conversely the thickness of the layers may be decreased by increasing the sharpness of the taper.

If it is desired to produce small irregular chips of ice, as illustrated in FIG. 7, the ice maker 10 is provided with an extrusion member 83 configured to produce small irregular chips. The extrusion member 83 has a base flange 42e supported by the supporting flange 41e formed at the uppermost end portion of the discharge conduit 28e, and the fastening means 44e passes through a base flange 43e formed on the delivery conduit 39e and the base flange 43e and the support flange 42e, thereby clamping the delivery conduit, the extrusion member and the discharge conduit in an assembled relationship. Thus, the extrusion member 83 is interchangeable with either the extrusion means 38 or 75.

In that embodiment of the present invention, the extrusion member 83 has a symmetrical transverse cross section and is characterized by a short chip forming section 84 having sharply tapered inner walls 86. As the mass of ice particles, including slush and chunks, advanced axially upwardly by the helical blades 31e, passes through the reduced cross sectional area formed by the tapered walls 86 inwardly directed forces are applied to the columnar mass of ice flake product, thereby to squeeze excess liquid from the product which is recirculated through the ice maker 10. The tapered section 84 should be sufficiently short to prevent the mass of ice particles from agglomerating into a hard shaft or column of ice such as that produced by the extrusion member 38, but the tapered section 84 should be sufficiently long to remove a portion of the excess water and cause the smallest particles to agglomerate into somewhat larger chunks.

If desired, a disintegrator 87 may be utilized with the extrusion member 83. The disintegrator 87 has a first arm 88 extending axially from the screw shaft 32e and coaxially and corotatably connected thereto. A second arm 89 is offset from the arm 88. Upon rotation of the disintegrator 87, the arm 88 breaks up the ice product which is forced through a reduced diameter opening 91 formed by the tapered side walls 86, thereby to prevent the mass of ice particles from agglomerating in the delivery conduit 39e.

From the foregoing description, it will be noted that the present invention provides variously configured extrusion means specifically designed to produce an ice product of certain configurations. Furthermore the ice maker is characterized by support and attachment means permitting an extrusion means producing one configuration of ice products to be replaced by another extrusion means, thereby adapting the ice maker to produce a differently configured ice product. Thus, the present invention provides a basic ice maker construction and various interchangeable extrusion means which are individually attachable to a discharge of the ice maker.

Although various minor modifications might be suggested by those versed in the art it should be understood that we wish to embody within the scope of the patent warranted hereon all such modifications as reasonably and properly come within the scope of our contribution to the art.

The embodiments of the present invention in which an exclusive property or privilege is claimed are defined as follows:

1. The method of making ice which includes the steps of:
   supplying water to a first stage freezing zone having an upright cylindrical refrigerated surface;
   continuously augering the cylindrical, refrigerated surface in said first stage freezing zone to remove thin films of ice product frozen thereon and to advance the removed ice product axially upwardly in said first stage zone;
   collecting removed ice product and excess water in a second stage collection zone;
   mechanically transferring the collected ice product from said second stage collection zone to a third stage compression zone having an outlet spaced above the level of said first stage zone and being of convergent cross sectional area ahead of said outlet;
   compression augering the collected ice product through the third stage compression zone to remove the excess water and to extrude the product out of said outlet of said third stage compression zone in the form of a compacted, dehydrated hard ice column; and
   interposing an obstruction in the path of movement of the emerging hard ice column to shatter the column into separate pieces of selected utilitarian size and configuration.

2. The method as defined in claim 1 wherein the step of collecting the removed ice product comprises directing the removed ice product generally radially inwardly of an axis of said cylindrical refrigerated surface to said compression zone, which is disposed centrally of said cylindrical refrigerated surface.

* * * * *